United States Patent [19]
Karlsson

[11] Patent Number: 6,034,360
[45] Date of Patent: Mar. 7, 2000

[54] INFRARED RADIATOR

[75] Inventor: Kai Karlsson, Helsinki, Finland

[73] Assignee: Instrumentarium Oy, Helsinki, Finland

[21] Appl. No.: 08/667,126

[22] Filed: Jun. 19, 1996

[30] Foreign Application Priority Data

Jun. 20, 1995 [FI] Finland ................................. 953062

[51] Int. Cl.⁷ .................................................. H05B 3/10
[52] U.S. Cl. ................................... 219/553; 250/504 R
[58] Field of Search .................................. 219/553, 494,
219/544, 472, 251; 392/407, 498; 361/103–106;
250/504

[56] References Cited

U.S. PATENT DOCUMENTS

| | | | |
|---|---|---|---|
| 4,039,778 | 8/1977 | Williams | 219/541 |
| 4,499,382 | 2/1985 | Vincent . | |
| 4,546,485 | 10/1985 | Griffiths | 373/28 |
| 4,620,104 | 10/1986 | Nordal et al. . | |
| 4,738,700 | 4/1988 | Grundy | 373/29 |
| 4,754,124 | 6/1988 | Howell | 219/523 |
| 5,247,185 | 9/1993 | Herrera et al. | 250/504 |
| 5,436,457 | 7/1995 | Tomita . | |

FOREIGN PATENT DOCUMENTS

| | | |
|---|---|---|
| 4420340 | 12/1994 | Germany . |
| 1543341 | 4/1979 | United Kingdom . |
| 93/09412 | 5/1993 | WIPO . |

*Primary Examiner*—Mark Paschall
*Assistant Examiner*—Jeffrey Pwu
*Attorney, Agent, or Firm*—Andrus, Sceales, Starke & Sawall

[57] ABSTRACT

Infrared radiator has a heating element (1) heated by electric current and a first thermocouple (2) thermally coupled to the heating element to measure its temperature. According to the invention, the first thermocouple (2) is electrically so connected to the heating element (1) that the electric current used to heat the heating element flows through the thermocouple. The invention allows the temperature of the heating element to be measured without the use of a separate temperature detector, which would cause problems.

25 Claims, 2 Drawing Sheets

INFRARED RADIATOR

BACKGROUND OF THE INVENTION

The present invention relates to an infrared radiator.

A resistor element heated by electric current is generally used in gas analyzers based on the measurement of infrared absorption in absorption bands characteristic of the gases under measurement. The advantages of such a thermal radiation source include a low price, fast starting and a wide-band radiation output consistent with Planck's law.

According to Planck's law, the radiation output of a thermal radiator is strongly dependent on the temperature of the radiating surface. For instance, when the carbon dioxide content in the expired air of an anesthetized patient is being measured with 4.27 μm wavelength, the output of the radiation source increases over 4% as its temperature rises from 900 K→0 K. Such a temperature change may occur e.g. when the ambient temperature of the gas analyzer changes by 10° C.

As is known, the effect of the change in radiation output on the measurement accuracy of the analyzer can be eliminated by using dual-beam optics in the analyzer. However, this requires moving mechanical parts, which reduce the analyzer's reliability and life span and increase its price.

The temperature changes in the infrared source can be taken into account by periodically performing a zero point adjustment, which, however, interrupts the analyzer's normal operation, thereby impairing patient safety. During the transition after the starting of the analyzer, zero point adjustments may have to be performed at intervals of a few minutes intervals.

From the point of view of construction, operation and measurement accuracy of the gas analyzer, it would therefore be desirable to stabilize the temperature of the infrared source accurately as possible.

There are several infrared radiators known in the art, one of which is presented in PCT publication WO93/09412. To measure the mean temperature of the heating element, this solution uses a temperature detector in conjunction with the heating element acting as an infrared source, the detector being thermally coupled to the infrared source but electrically isolated from it. In addition, a regulator is used which, based on the measured temperature, adjusts the power supplied to the heating element so that the temperature of the heating element remains at the desired level.

On the other hand, U.S. Pat. No. 4,620,104 presents a solution in which the surface to be heated with electric current is placed on a platelike base, the opposite surface of which is provided with a coating acting as a temperature detector. Based on the feedback obtained from the coating, the power supplied to the radiation source is adjusted so as to keep the radiation source at a constant temperature.

Both of the aforementioned solutions have the drawback that measuring the temperature of the radiation source requires a separate temperature detector along with the mechanical fittings, electrical insulation and conductors involved. As the temperature of the radiation source rises to a high level during operation, the temperature detector and its electrical and mechanical fittings are subjected to both large and rapid temperature changes that impair their reliable implementation and reduce the reliability of the infrared source.

U.S. Pat. No. 4,499,382 presents an infrared radiator in which the temperature of the radiation source is kept constant by supplying the infrared source with a power level such that the resistance depending on the temperature of the resistor core coil remains constant. Since the temperature coefficient of the resistance of the resistor wire generally used, made of chrome nickel alloy, is very small, typically under 100 micro-ohms/°C., the use of this method requires very accurate resistance measurement that is independent of temperature.

SUMMARY OF THE INVENTION

The object of the present invention is to eliminate the problems described above.

A specific object of the present invention is to produce a new and simple implementation in which the problems referred to are eliminated by an appropriate choice of construction of the infrared radiator.

A further object of the present invention is to produce a reliable infrared radiator that has a good ability to withstand rapid temperature changes.

As for the features characteristic of the present invention, reference is made to the claims.

The infrared radiator of the invention comprises a heating element which is heated by electric current and which emits infrared radiation dependent on temperature, and a first thermocouple thermally coupled to the heating element for the measurement of the temperature of the heating element. According to the invention, the thermocouple is electrically so connected to the heating element that the electric current used to heat the heating element flows through the first thermocouple.

The present invention has the advantage over prior-art solutions in that the invention provides a simplified infrared radiator structure because the heating element has a construction that allows one extra junction to be omitted, because the material of the electrodes or connecting elements supplying the electricity used to heat the heating element has been so selected that the thermocouple used for the measurement of the temperature of the heating element is formed at the junction of the electrodes or connecting elements and the heating element. Thus, the invention allows the temperature of the IR radiator to be measured without a separate temperature detector and measuring conductors, avoiding the associated problems.

Moreover, the present invention provides an infrared radiator having a simpler and therefore more reliable construction. Furthermore, the manufacturing costs of the infrared radiator of the invention are low.

In an embodiment of the present invention, the infrared radiator comprises a second thermocouple allowing compensation of errors occurring in the temperature measurement by the first thermocouple.

In a preferred embodiment of the present invention, the thermocouple comprises a first and a second connecting element, such as a connecting wire, electrode or the like. Preferably the connecting elements are of an elongated shape and made of an electrically conductive material. The essential point is that the connecting elements are made of the same material, which is substantially different from the material of the heating element. The connecting elements are preferably made of a chrome nickel alloy, nickel or Kovar.

In a preferred embodiment of the invention, the heating element is a heating filament coil connected to a compensating element made of the same material, by means of which the filament coil is kept at a distance from the connecting element and which has a predetermined length. Preferably the compensating element has a cross-sectional area larger than the cross-sectional area of the filament. Further, the compensating element or transfer element is an elongated conductor or electrode, by means of which the second thermocouple—the thermocouple between the compensating element and a connecting element—is taken to a distance from the heating element.

Preferably the first connecting element is thermally and electrically connected to the heating element, the first thermocouple being formed between the first connecting element and the heating element so that the first thermocouple is substantially at the same temperature as the heating element. The first thermocouple may be placed at any location on the filament coil, but preferably at one end of the coil, so that when the compensating element is connected to the opposite end of the coil relative to the first thermocouple, the electric current connected via the compensating element will flow through the entire coil. Further, preferably the second connecting element is thermally and electrically connected to the compensating element, so that the second thermocouple is formed between the second connecting element and the compensating element in such manner that the second thermocouple is at a predetermined temperature, e.g. room temperature.

In a preferred embodiment of the invention, the construction of the filament coil is so chosen that the first thermocouple can be located in the space within the filament coil, where, due to the filament material, the temperature very closely corresponds to the temperature on the external surface of the filament coil. Moreover, since the first thermocouple is surrounded by the filament coil and lies very close to it and because the thermocouple has a small thermal mass, its temperature is continuously very closely the same as the average temperature on the inner surface of the heating element. As the distance between the interior and exterior surfaces of the heating element is only as large as the diameter of the filament, and because heat is transferred in the entire cross-section of the filament, every point on the interior surface of the filament coil is very closely at the same temperature as the nearest point on the exterior surface of the heating element.

Preferably the material of the heating element and the first and second connecting elements is so chosen that a temperature dependent thermo-voltage is set up in the first and second thermocouples. Such preferred material pairs could be e.g. copper-constantan, nickel-chrome nickel, iron-constantan or platinum-platinic rhodium.

In a preferred embodiment of the present invention, the infrared radiator comprises a measuring device coupled to the first and second connecting elements to measure the thermo-voltage difference between the first and second thermocouples.

In a preferred embodiment of the present invention, the infrared radiator comprises a variable power source which is electrically connected to the first and second connecting elements in parallel with the measuring device to provide electricity for the heating element. The power source may consist of any variable power source known in itself. The power source is preferably momentarily disconnected while the measurement is being performed, which usually takes a few tenths of a second.

BRIEF DESCRIPTION OF THE DRAWINGS

In the following, the invention is described by the aid of examples of its embodiments by referring to the attached drawing, in which.

DETAILED DESCRIPTION OF THE PREFERRED EMBODIMENT

Figure 1:
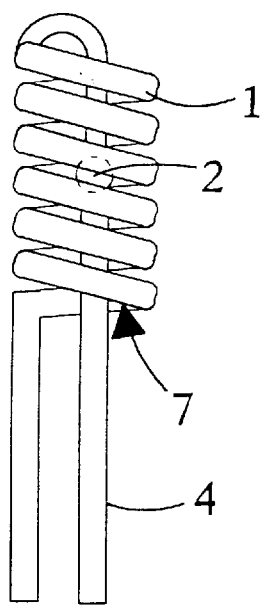
FIG. 1 presents an infrared radiator according to the present invention, seen in lateral view.

The basic implementation of the present invention shown in FIG. 1 comprises a filament coil wound from incandescent filament, acting as a heating element 1, one end of which has been bent into the space 7 within the coil, and an elongated connecting element 4 coupled to the filament in the interior space 7. According to the invention, the temperature of the heating element 1 is measured by measuring the thermo-voltage between the heating element and the connecting element 4.

Another infrared radiator according to the invention comprises, besides the elements presented in FIG. 1, an elongated compensating element 6 connected to the filament coil 1 with a junction 11 and having a cross-sectional area larger than that of the filament. Moreover, the infrared radiator comprises a second connecting element 5.

Figure 2:
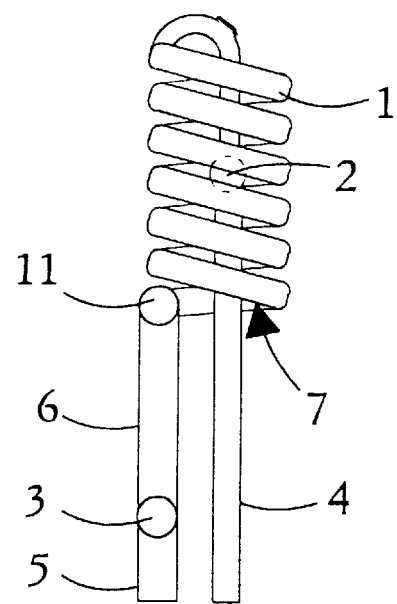
FIG. 2 presents another infrared radiator according to the present invention in lateral view.

In FIG. 2, the first connecting element 4 is thermally and electrically connected to the filament coil to form a first thermocouple 2 in the interior space 7 of the filament coil 1 substantially at the same temperature as the filament coil exterior surface from which heat is radiated. The second connecting element 5 is connected to the compensating element 6 to form a second thermocouple 3 at a predetermined temperature. The first thermocouple 2 is called a measuring thermocouple and the second thermocouple is called a reference thermocouple. The materials of the filament coil 1 and connecting elements 4, 5 are so chosen that temperature dependent thermo-voltages are produced in the first and second thermocouples 2, 3.

Figure 3:
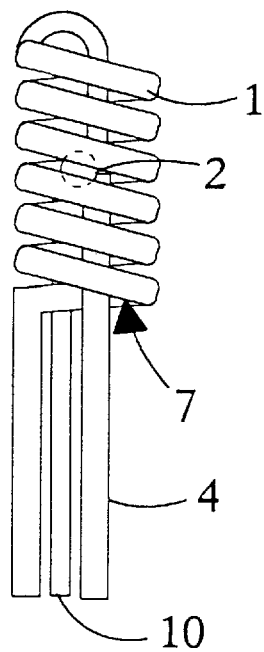
FIG. 3 presents a third infrared radiator according to the present invention in lateral view.

FIG. 3 presents a third implementation of the infrared radiator of the invention, additionally comprising a measuring electrode 10. In this case, a thermocouple measuring the temperature of the heating element 1 is formed between the measuring electrode 10 and the heating element. The temperature is measured by measuring the thermo-voltage between the heating element 1 and the measuring electrode.

Figure 4:
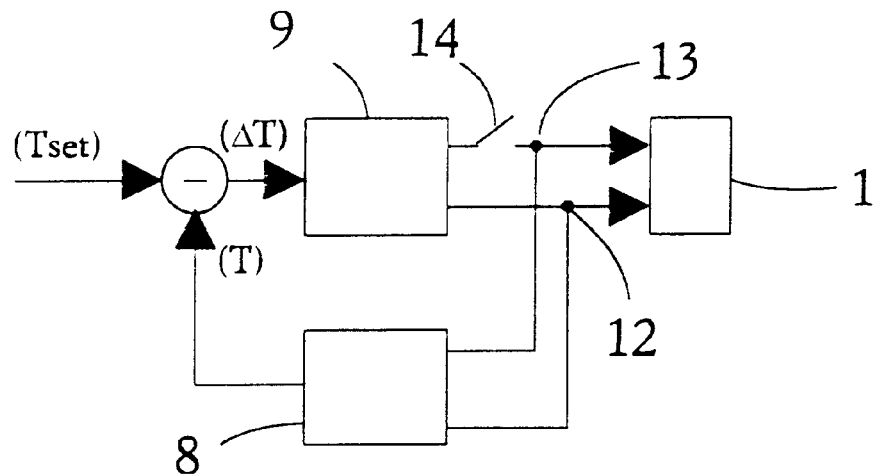
FIG. 4 presents a diagram representing the power regulation system used in the infrared radiator in FIG. 2.

Referring to FIG. 4, the temperature of the infrared radiator in FIG. 2 is controlled as follows. The radiation source, i.e. the filament coil 1, is electrically connected to the power source 9 and to the measuring conductors of the measuring device 8 via connecting elements 4, 5 (not shown in FIG. 4) at junctions 12 and 13.

In the solution provided by the invention, the temperature of the measuring thermocouple 2 between the heating element 1 and connecting element 4 is measured by disconnecting by means of switch 14 the heating current supplied to the heating element 1 and measuring the voltage Vtemp between points 12 and 13 while the heating current is off.

Figure 5:
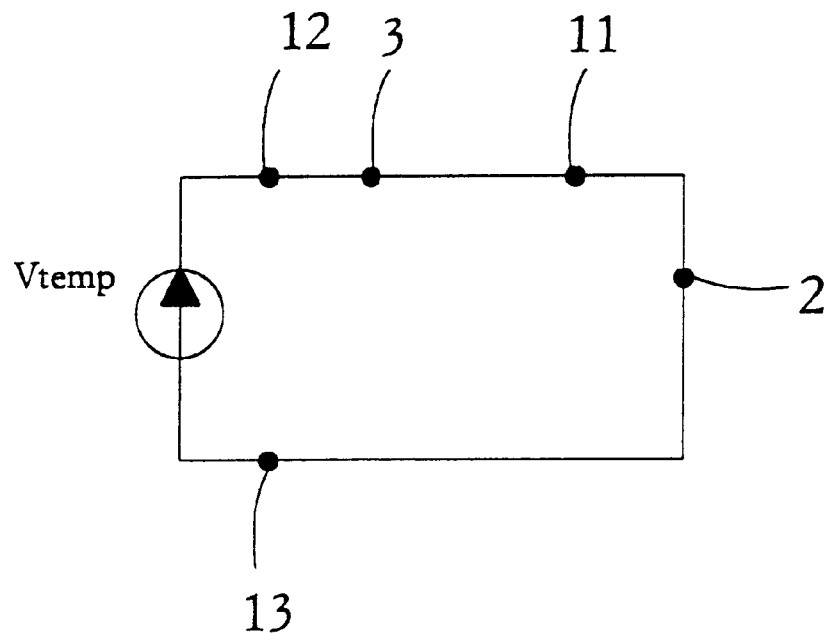
FIG. 5 presents a diagram representing a measuring circuit as used in the infrared radiator in FIG. 1.

Referring now to FIG. 5, which represents the measuring circuit in a diagrammatic form, the measured voltage Vtemp is the voltage seen by the measuring device 8, as follows:

$$Vtemp = V12 + V3 + V11 + V13$$

Since at junction 11 the filament coil 1 is connected to a compensating element 6 made of the same material as the coil, no thermo-voltage is present across the junction, so V11=0.

At junctions 12 and 13, measuring conductors identical with each other in material are coupled to connecting elements 4 and 5 identical with each other in material. As the junctions 12 and 13 are held at the same temperature, thermo-voltages of the same magnitude are present across them, and these voltages are summed in the measuring circuit in opposite sense. Therefore, V12=−V13. Thus, the result will be:

Vtemp=V2+V3+V11+V12+V13=V2+V3+0+V12−V12=V2+V3

Since at junctions 2 and 3 connecting elements 4 and 5 identical with each other in material are connected in opposite sense to the compensating element 6 and filament coil 1 which again are identical with each other in material, V2=−V3 when thermocouples 2 and 3 are at the same temperature. Vtemp will change when the temperature difference between the thermocouples changes. Therefore, the temperature difference between the thermocouples 2 and 3 can be established by measuring the voltage Vtemp by means of the measuring device 8.

The temperature difference between junctions 2 and 3 can be kept constant by adjusting the power supplied by the power supply circuit 9 to the heating element 1 so as to keep the voltage Vtemp unchanged.

On the other hand, junction 2 can be held at a desired constant temperature by measuring the temperature of the reference thermocouple 3 and adjusting the power supplied by the power supply circuit 9 to the heating element 1 so that the voltage Vtemp corresponds to the difference between the desired constant temperature and the temperature at junction 3.

In both cases described above, the adjustment can be implemented by known techniques in many ways. To sum up, let it be stated that the essential content of the present invention concerns an infrared radiator construction in which the filament coil temperature, which is used as feedback in feedback control, is measured directly by means of a thermocouple which can be easily integrated with the filament coil structure and thus without using a separate temperature detector thermally connected to the filament coil or measuring its resistance.

The invention is not limited to the embodiments described above as examples, but instead many variations are possible within the inventive idea defined by the claims.

I claim:

1. An infrared radiator for generating infrared radiation responsive to the passage of electric current through the radiator from an electrical source, said radiator comprising:

a heatable element (1) formed of a first electrically conductive material, said heatable element being couplable to the electrical source to form an electrical circuit path in which electric current flows from the electrical source through the element to energize and heat the element to elevate its temperature, said element, when heated to an elevated temperature, generating infrared radiation; and a conductor (4, 10) formed of a second electrically conductive material different from said first electrically conductive material, said conductor being electrically connected to said heating element at a junction, the connection of the different electrically conductive materials of said conductor and heating element at said junction comprising a temperature measuring thermojunction in said electrical circuit path of said heatable element through which thermojunction, the current of the electrical source flows when the heating element is energized, said thermojunction being subjected to the heat of said heatable element, said measuring thermojunction altering its electrical characteristics when subjected to the heat of said heatable element to indicate the temperature of the heatable element and hence the properties of the infrared radiation generated by the heatable element.

2. The infrared radiation as defined in claim 1 wherein said conductor is coupled in series with said heatable element in said electrical circuit path.

3. An infrared radiator as defined in claim 1 further including:

a further conductor coupled to said heating element for forming a second thermojunction (3) displaced from said measuring thermojunction, said second thermojunction being formed in said electrical circuit path so that current of the electrical source flows through said second thermojunction when said heatable element is energized, the electrical characteristics of said measuring and second thermojunctions indicating the temperature of the heatable element, and hence the properties of the infrared radiation generated by the heatable element.

4. The infrared radiator as defined in claim 3 wherein said further conductor forming said second thermojunction is coupled in a series path with said heatable element.

5. The infrared radiator as defined in claim 4 wherein said conductor forming said measuring thermojunction is coupled in series with said heatable element.

6. The infrared radiator as defined in claim 1 wherein said conductor forming said measuring thermojunction (2) comprises a connector (4) joined to said heatable element, the joinder of said connector and said heatable element forming said measuring thermojunction, said connector being couplable to the electrical source intermediate said heatable element and the electrical source for forming a portion of said electrical circuit path.

7. The infrared radiator as defined in claim 3 wherein said further conductor forming said second thermojunction comprises a second connector (5) joined to said heatable element to form said second thermojunction (3), said second connector being couplable to the electrical source intermediate said heatable element and the electrical source for forming a portion of said electrical circuit path.

8. The infrared radiator as defined in claim 6 wherein said further conductor forming said second thermojunction comprises a second connector (5) joined to said heatable element to form said second thermojunction (3), said second connector being couplable to the electrical source intermediate said heatable element and the electrical source for forming a portion of said electrical circuit path.

9. The infrared radiator as defined in claim 8 wherein said first and second connectors (4, 5) are formed of a substantially similar electrically conductive material and wherein said heating element is formed of an electrically conducting material dissimilar from that of said first and second connectors.

10. The infrared radiator as defined in claim 9 wherein said heating element (1) is made of a Kanthal A type material and wherein said first and second connectors (4, 5) are made of one of nickel, chrome nickel, or Kovar.

11. The infrared radiator as defined in claim 9 wherein said first and second connectors and said heatable element are formed of one of the following material pairs; copper-constantan, nickel-chrome nickel, iron-constantan, and platinum-platinic rhodium.

12. The infrared radiator as defined in claim 1 wherein said conductor for forming said measuring thermojunction comprises a measuring electrode (10).

13. The infrared radiator as defined in claim 3 wherein said conductor for forming said measuring thermojunction comprises a measuring electrode (10).

14. The infrared radiator as defined in claim 13 wherein said measuring electrode and said further conductor forming said second thermojunction are formed of a substantially similar electrically conductive material and wherein said heating element is formed of an electrically conductive material dissimilar from that of said measuring electrode and said second conductor.

15. The infrared radiator as defined in claim 14 wherein said heating element (1) is made of a Kanthal A type material and wherein said measuring electrode and said further conductor are made of one of nickel, chrome nickel, or Kovar.

16. The infrared radiator as defined in claim 14 wherein said measuring electrode and said further conductor and said heatable element are formed of one of the following material pairs; copper-constantan; nickel-chrome nickel; iron-constantan; and platinum-platinic rhodium.

17. The infrared radiator as defined in claim 1 further including a compensating element electrically connected to said heatable element and wherein said heatable element (1) and said compensating element (6) are formed of the same electrically conducting material.

18. The infrared radiator as defined in claim 17 wherein said heating element comprises a filament coil connected to said compensating element, said compensating element having a predetermined length.

19. The infrared radiator as defined in claim 17 wherein a cross sectional area of said compensating element transverse to the direction of current flow is larger than a cross sectional area of the heatable element (1) transverse to the direction of current flow.

20. The infrared radiator as defined in claim 7 wherein said heating element includes a compensating element (6) connected to said heatable element, and wherein said second connector (5) is connected to said compensating element to form said second thermojunction (3) said second connector being couplable to the electrical source for forming a portion of the electrical circuit path.

21. The infrared radiator as defined in claim 1 wherein said heating element (1) is formed as a filament coil and wherein said measuring thermojunction (2) is disposed within said filament coil.

22. The infrared radiator as defined in claim 1 further including a measuring device (8) for measuring the electrical characteristic of said thermojunction when said heatable element is deenergized.

23. The infrared radiator as defined in claim 1 further including said electrical source coupled to said heatable element and wherein said electrical source comprises a variable power source for energizing said heatable element.

24. The infrared radiator as defined in claim 22 further including said electrical source coupled to said heatable element and wherein said electrical source comprises a variable power source for energizing said heatable element responsive to the measurements of said measuring device.

25. An infrared radiator for generating infrared radiation responsive to the passage of electric current through the radiator from an electrical source, said radiator comprising:

a heatable element (1), said heatable element being formed as a spiral coil of a filament of electrically conducting material, the element being energizable by electric current to heat the element and generate infrared radiation;

a connector (4) connected in series with said heatable element for forming a measuring thermojunction (2) with said heatable element, said measuring thermojunction being located within the coil of said heating element, said connector being couplable to the electrical source so that current of the electrical source flows through the thermojunction when said heatable element is energized, said thermojunction being subjected to the heat of said heatable element;

a compensating element (6) connected in series to said heatable element, said heatable element (1) and said compensating element being formed of the same electrically conducting material; and a second connector (5) connected in series with said compensating element to form a second thermojunction (3) displaced from said measuring thermojunction, the electric current of the electrical source flowing through said second thermojunction when said heatable element is energized, the electrical characteristics of said measuring and second thermojunctions enabling the temperature of the heatable element, and hence the properties of the infrared radiation generated by the heatable element, to be determined, said second connector being couplable to the electrical source, said series connected first connector, heatable element, compensating element, and second connector forming an electrical circuit path through said infrared radiator, said first and second connectors (4, 5) being formed of a substantially similar electrically conductive material, said heating element being formed of an electrically conducting material dissimilar from that of said first and second connectors.

* * * * *